United States Patent
Sumimoto

(10) Patent No.: US 7,545,123 B2
(45) Date of Patent: Jun. 9, 2009

(54) CONTROL APPARATUS FOR VEHICULAR AC GENERATOR

(75) Inventor: Katsuyuki Sumimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 188 days.

(21) Appl. No.: 11/806,905

(22) Filed: Jun. 5, 2007

(65) Prior Publication Data

US 2008/0136379 A1    Jun. 12, 2008

(30) Foreign Application Priority Data

Dec. 12, 2006    (JP) .............................. 2006-334345

(51) Int. Cl.
*H02P 9/00*    (2006.01)
(52) U.S. Cl. .............................. 322/25; 322/22; 322/24; 322/28
(58) Field of Classification Search .................. 322/22, 322/24, 25, 28
See application file for complete search history.

(56) References Cited

U.S. PATENT DOCUMENTS 6,344,734 B1 *    2/2002    Iwatani et al. .................. 322/28
6,900,618 B2 *    5/2005    Maehara ....................... 322/28
7,224,145 B2 *    5/2007    Pierret et al. .................. 322/25

FOREIGN PATENT DOCUMENTS

| JP | 01-315229 A | 12/1989 |
| JP | 6-261464 A | 9/1994 |
| JP | 7-39200 A | 2/1995 |
| JP | 07-135741 A | 5/1995 |
| JP | 11-069892 A | 3/1999 |
| JP | 2006-115619 A | 4/2006 |

* cited by examiner

*Primary Examiner*—Nicholas Ponomarenko
*Assistant Examiner*—Iraj A Mohandesi
(74) *Attorney, Agent, or Firm*—Sughrue Mion, PLLC

(57) ABSTRACT

A control apparatus for a vehicular AC generator analyzes, at least, a "HIGH" logic continuation time, a "LOW" logic continuation time and the pulse width duty of an external signal, for the external signal pulse inputted from an external unit. In a case where the "HIGH" logic or "LOW" logic of the external signal pulse has continued for a predetermined time period, the control apparatus controls a generator control voltage as either of adjustment voltages consisting of the two values of an ordinary voltage and a voltage lower than the ordinary voltage. On the other hand, in a case where the "HIGH" logic or "LOW" logic of the external signal pulses are iterated within a predetermined time period, and where the pulse width duty of the external signal falls within a predetermined range, the control apparatus controls the generator control voltage as a multistage or linear adjustment voltage which is the function of the pulse width duty ratio.

7 Claims, 7 Drawing Sheets

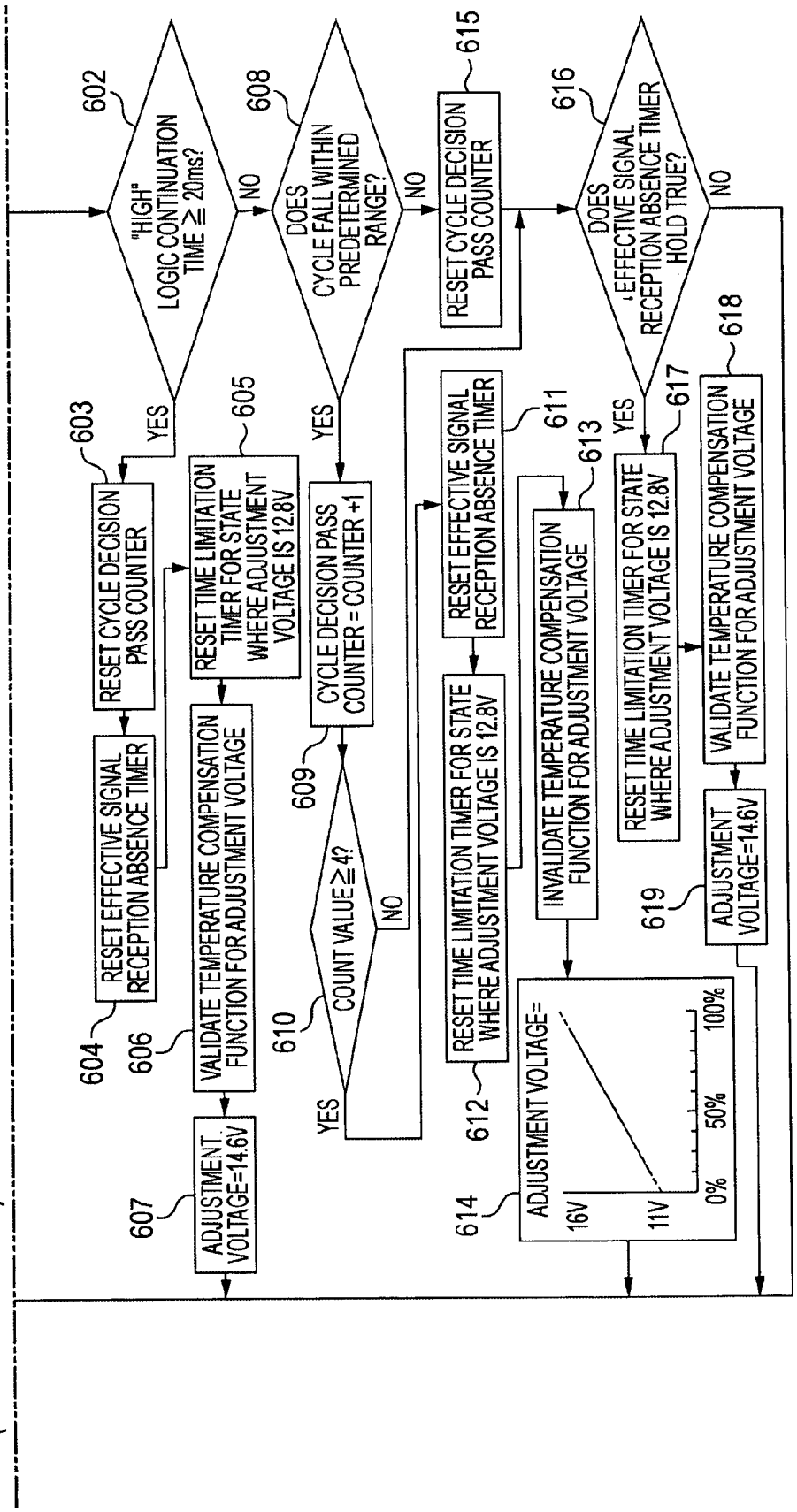

CONTROL APPARATUS FOR VEHICULAR AC GENERATOR

BACKGROUND OF THE INVENTION

1. Field of the Invention

This invention relates to a control apparatus for a vehicular AC generator, in which the output voltage control of the vehicular AC generator is performed on the basis of a communication signal from a vehicle side ECU (engine control unit).

2. Description of the Related Art

In recent years, a conventional alternator for controlling the output voltage of a vehicular AC generator has been one in which the control value of the control voltage thereof is changed-over by a command value delivered from an external control unit such as ECU. Besides, control schemes for such a control voltage, presently in use, are broadly classified into the two schemes of "control-voltage two-stage control" and "control-voltage multistage control".

The "control-voltage two-stage control" can change-over the control value of the alternator control voltage in two stages, and the control value usually consists of the two values of an ordinary voltage and a voltage lower than the ordinary voltage (refer to JP-A-6-261464 in detail).

The voltage lower than the ordinary voltage is used for suppressing a drive torque for the power generation of the alternator in order to enhance the startability of an engine or to enhance the acceleration performance of a vehicle, and it is changed-over to the ordinary voltage when the starting step of the engine or the accelerating step of the vehicle has ended.

On the other hand, the "control-voltage multistage control" can change-over the control value of the alternator control voltage in multistage fashion or linearly, and the operation of suppressing the drive torque in the engine starting mode or the vehicle accelerating mode as has been permitted by the two-stage control is made adjustable in multistage fashion here.

More specifically, the voltage ("LOW" side voltage) lower than the ordinary voltage in the two-stage control is usually set at respective set values which differ depending upon a vehicle skeleton, a battery, a vehicle service zone, a target fuel cost, etc. Moreover, orders for altering the factors are often made during the development of a vehicle. By way of example, even in the case of the two-stage control of an identical automobile manufacturer, orders in which the "LOW" side voltage has the different set voltage values of, for example, 12.4 V, 12.6 V and 12.8 V are given in accordance with individual vehicle sorts, and regulators which correspond to the set values are designed and mass-produced. However, when a request for altering the set value is received during the development of the vehicle, the design alteration of the regulator necessitates a huge cost, and the burden becomes heavy.

In contrast, in the case of the multistage control, a performance capable of controlling a range of, for example, 11-16 V in, for example, 128 stages is bestowed. When the automobile manufacturer utilizes the multistage control, the control value can be freely governed to a desired set voltage value very efficiently. Moreover, in the multistage control, the control value can be controlled to a set voltage value higher than the ordinary voltage. By way of example, therefore, the alternator power-generation voltage can be raised in a vehicle deceleration mode, thereby to rapidly charge the battery (as a regenerative control). Besides, the battery has a temperature characteristic in an efficient charging voltage value. In this regard, the ECU monitors the temperature of the battery so as to determine the optimum charging voltage and to give a command as the control value of the alternator control voltage, whereby the state of the battery can be held appropriate to prolong the lifetime thereof (refer to JP-A-7-194023 in detail).

As stated above, the two schemes of the "control-voltage two-stage control" and the "control-voltage multistage control" are used in the control devices of the alternators in the present situation, so that a signal operation within the ECU becomes greatly different depending upon which of the schemes is selected. Accordingly, the alteration of the control scheme at the stage of development or after the start of use results in forcing many design alterations or a burden in cost. By way of example, alternators being products in which designed different control devices A, B and C are mounted are naturally handled in different product names as the alternators A, B and C. Troublesomely a supplier and the automobile manufacturer make a stock management and an assemblage management for each of the different products.

Recently, the "control-voltage multistage control" with which the automobile manufacturer can freely alter and govern the control value without involving the design alterations has come into use. However, when either of the control schemes is to be selected at the initial stage of the development of a vehicle, the "control-voltage two-stage control" in the existing system is often selected with a priority given to safety. In addition, even if the study of the "control-voltage multistage control" has become necessary at the intermediate stage or final stage of the development, the estimation of the vehicle has proceeded from the physical viewpoint of a component constituting the control device of the alternator selected at the initial stage, and hence, the adoption of the "control-voltage multistage control" involving the alterations of respectively physically different components becomes a very difficult situation.

SUMMARY OF THE INVENTION

This invention has been made in view of the fact that, in selecting the "control-voltage two-stage control" or the "control-voltage multistage control", an automobile manufacturer must select either of respectively physically different components in the present situation, and it has for its object to provide a control apparatus for a vehicular AC generator, in which the control device of an alternator has an interface performance capable of coping with both the "control-voltage two-stage control" and the "control-voltage multistage control" by the use of one component, whereby the alteration of the electric characteristic of the control apparatus can be fulfilled without adding any alteration from the viewpoint of the component, in the course of design or after the start of use.

A control apparatus for a vehicular AC generator according to this invention, including exciting current control means, external signal waveform analysis means, and adjustment voltage determination means. The exciting current control means controls an exciting current of the generator which is driven by an internal combustion engine, so that a power generation voltage of the generator or a voltage interlocking with the power generation voltage may become a predetermined adjustment voltage. The external signal waveform analysis means analyzes, at least, a "HIGH" logic continuation time, a "LOW" logic continuation time, and a pulse width duty of an external signal, for the external signal pulse inputted from an external unit. The adjustment voltage determination means controls the exciting current control means by setting either of adjustment voltages which consist of two values of an ordinary voltage and a voltage lower than the ordinary voltage, in a case where a "HIGH" logic or a "LOW"

logic of the external signal pulse has continued for a predetermined time period, and by setting a multistage or linear adjustment voltage which is a function of the pulse width duty ratio, in a case where the "HIGH" logic or "LOW" logic of the external signal pulses is iterated within a predetermined time period and where the pulse width duty of the external signal falls within a predetermined range.

In accordance with the control apparatus for the vehicular AC generator according to this invention, in the course of design or manufacture or after the start of use, the alterations between the "control-voltage two-stage control" and the "control-voltage multistage control" of a control device can be easily coped with without adding any alteration from the viewpoint of components. Thus, the higher efficiency and higher grade of a vehicular system can be promoted, and the manufacturing cost of the vehicular system can be reduced as a whole.

The foregoing and other objects, features, aspects and advantages of this invention will become more apparent from the following detailed description of this invention when taken in conjunction with the accompanying drawings.

DESCRIPTION OF THE PREFERRED EMBODIMENTS

Embodiment 1

Figure 1:
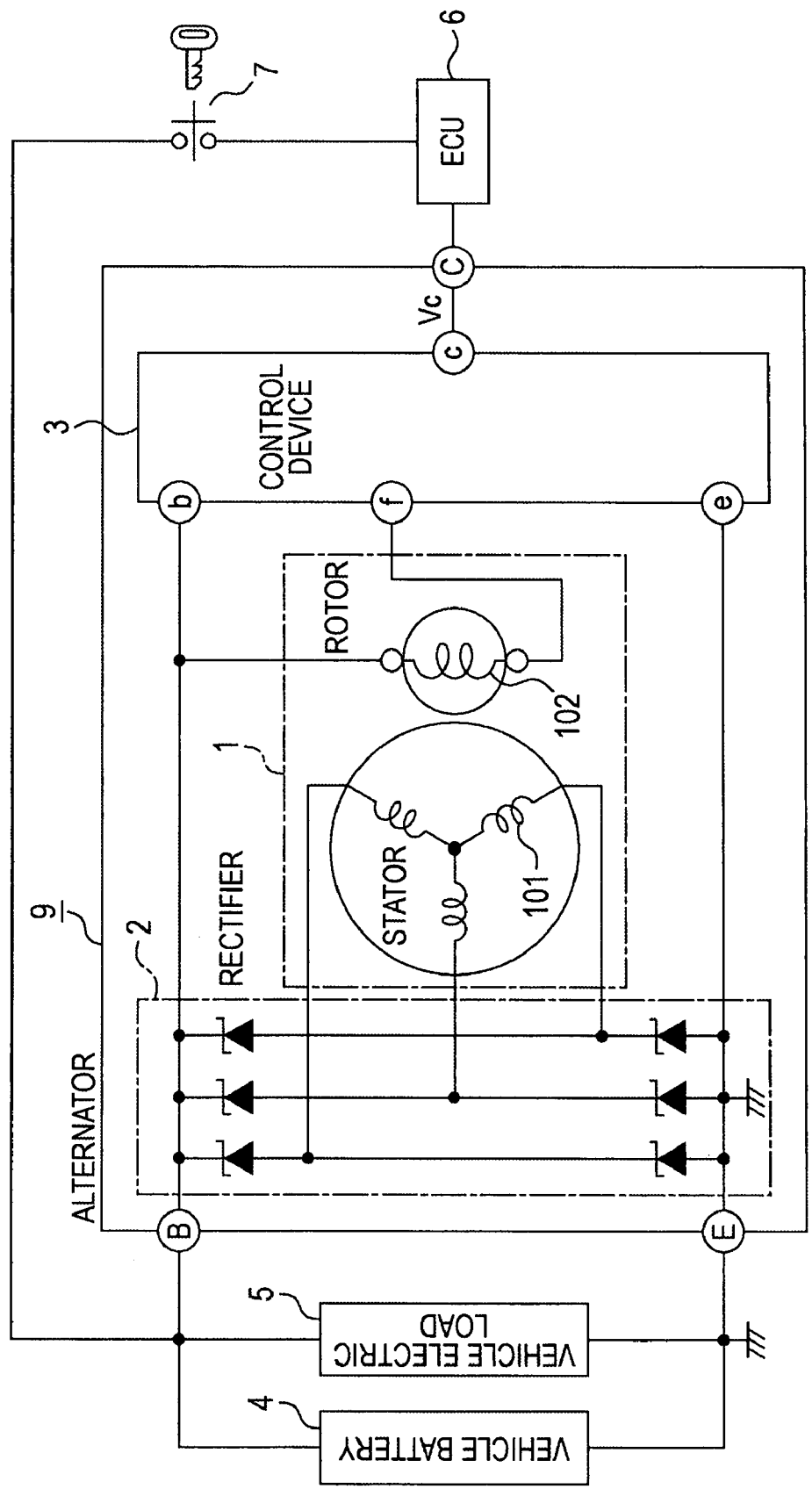
FIG. 1 is a diagram showing the typical system configuration of a control apparatus for a vehicular AC generator according to Embodiment 1 of this invention.

Now, the first embodiment of this invention will be described. FIG. 1 is a diagram showing the typical system configuration of a control apparatus for a vehicular AC generator to which this invention is directed. Referring to the figure, numeral 1 designates the AC generator which is driven by an engine (not shown), and which includes armature windings 101 constituting a stator, and a field winding 102 constituting a rotor. Numeral 2 designates a three-phase full-wave rectifier, and numeral 3 a control device (also termed "regulator") which controls the output voltage of the AC generator 1. Numeral 4 indicates a battery which is a vehicular power supply, numeral 5 a vehicle electric load, and numeral 6 an ECU being an external control unit, to which the voltage of the battery 4 is applied through an ignition switch 7 and which outputs a control voltage signal Vc to the C terminal of the control device 3. Incidentally, numeral 9 indicates an alternator which includes the AC generator 1, the three-phase full-wave rectifier 2 and the control device 3, and which includes a B terminal of power generation potential and an E terminal of earth potential in addition to the C terminal.

Next, operations in the system configuration will be described. When the ignition switch 7 is closed, the engine is started, whereby the field winding 102 is rotated to generate three-phase AC voltages in the armature windings 101. The three-phase AC voltages are converted into a DC voltage by the three-phase full-wave rectifier 2, so as to charge the battery 4 and to feed power to the vehicle electric load 5. When the power generation voltage has risen, the control device 3 interrupts current feed to the field winding 102, in accordance with a command concerning a control-voltage control value from the ECU 6, thereby to adjust the power generation voltage to a predetermined value. Incidentally, the b, c and e terminals of the control device 3 are at the same potentials as those of the B, C and E terminals of the alternator 10, respectively.

Figure 2:
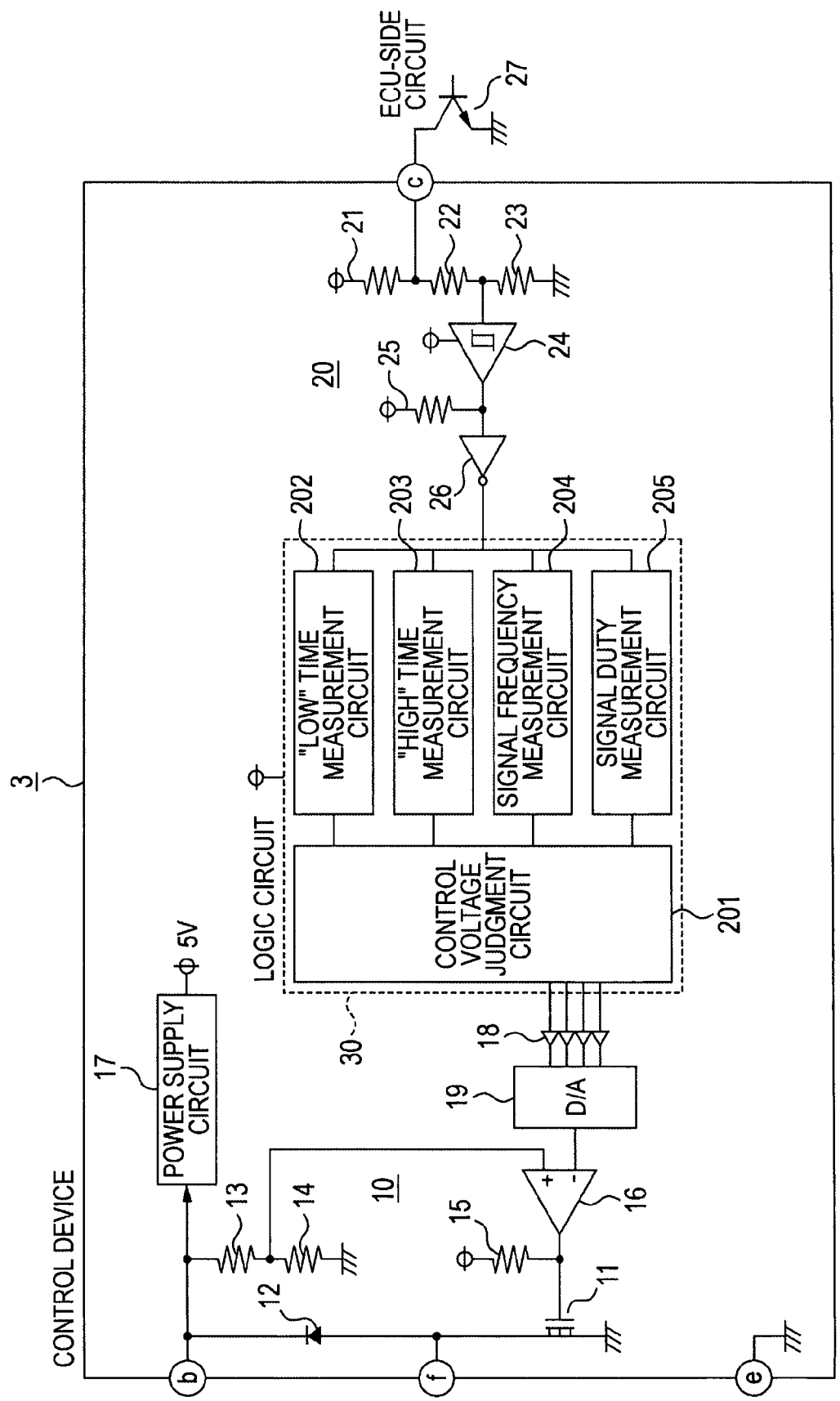
FIG. 2 is a circuit diagram showing an example of the internal configuration of a control device according to Embodiment 1 of this invention.

FIG. 2 is a circuit diagram showing one example of the internal configuration of the control device 3, and the embodiment of the control apparatus in which the alternator control voltage can be subjected to both the two-stage control and the multistage control by the signal manipulation of the c terminal will be described below. Referring to the figure, numeral 11 designates a transistor which is inserted in series with the field winding 102 illustrated in FIG. 1, for the switching control of a current that flows through the field winding 102, and as which a MOS-FET is usually adopted. Numeral 12 designates a flywheel diode for the switching control of the field current as is inserted between both the ends (b and f terminals) of the field winding 102. Numerals 13 and 14 designate a so-called "voltage sensor", which is configured of a voltage divider circuit of resistors and which feeds a power generation voltage to the plus side terminal of a comparator 16. Numeral 15 indicates a source for feeding the gate power of the transistor 11, and numeral 17 a power supply circuit which accepts the generator voltage from the b terminal so as to generate a constant voltage of, for example, 5 V. The transistor 11, flywheel diode 12, voltage sensor 13 and 14, gate power feeding source 15, comparator 16 and power supply circuit 17 constitute exciting current control means 10.

On the other hand, the c terminal is connected to an ECU-side transistor 27, and it is also connected to a power-feed-side resistor 21 and to voltage divider resistors 22 and 23 for monitoring the signal potential of the C terminal. A resistance which is at least 10 times as high as that of the power-feed-side resistor 21 is selected as the resistance of the voltage divider resistors 22 and 23. Accordingly, when the ECU-side transistor 27 is turned ON, the power-feed-side resistor 21 is pulled down on the ECU side, and power feed to a logic circuit 30 via a comparator 24, a feed source 25 and a buffer 26 is stopped. That is, the ON operation of the ECU-side transistor 27 pulls down the signal line potential of the C terminal, and the logic circuit 30 senses the signal line potential of the C terminal as "LOW", via potential decision means 20 which includes the circuit constituents 21-26 in the figure. To the contrary, the OFF operation of the transistor 27 causes the logic circuit 30 to sense the signal line potential of the C terminal as "HIGH".

The logic circuit 30 includes a "LOW" time measurement circuit 202, a "HIGH" time measurement circuit 203, a signal frequency measurement circuit 204 and a signal duty measurement circuit 205 which operate by receiving an output from the potential decision means 20, and a control voltage judgment circuit 201 which operates by receiving the outputs of the circuits 202-205. Incidentally, numeral 18 indicates a buffer, and numeral 19 a D/A conversion circuit. The comparator 16 compares a control voltage from the D/A conversion circuit 19 and the output voltage (the power generation voltage of the alternator) from the voltage sensor 13 and 14. In a case where the power generation voltage of the alternator is greater than the control voltage from the D/A conversion circuit 19, the comparator 16 performs the operation of stopping the power feed to the gate of the transistor 11 and thus turning OFF the current flowing through the field winding 102.

Figure 3:
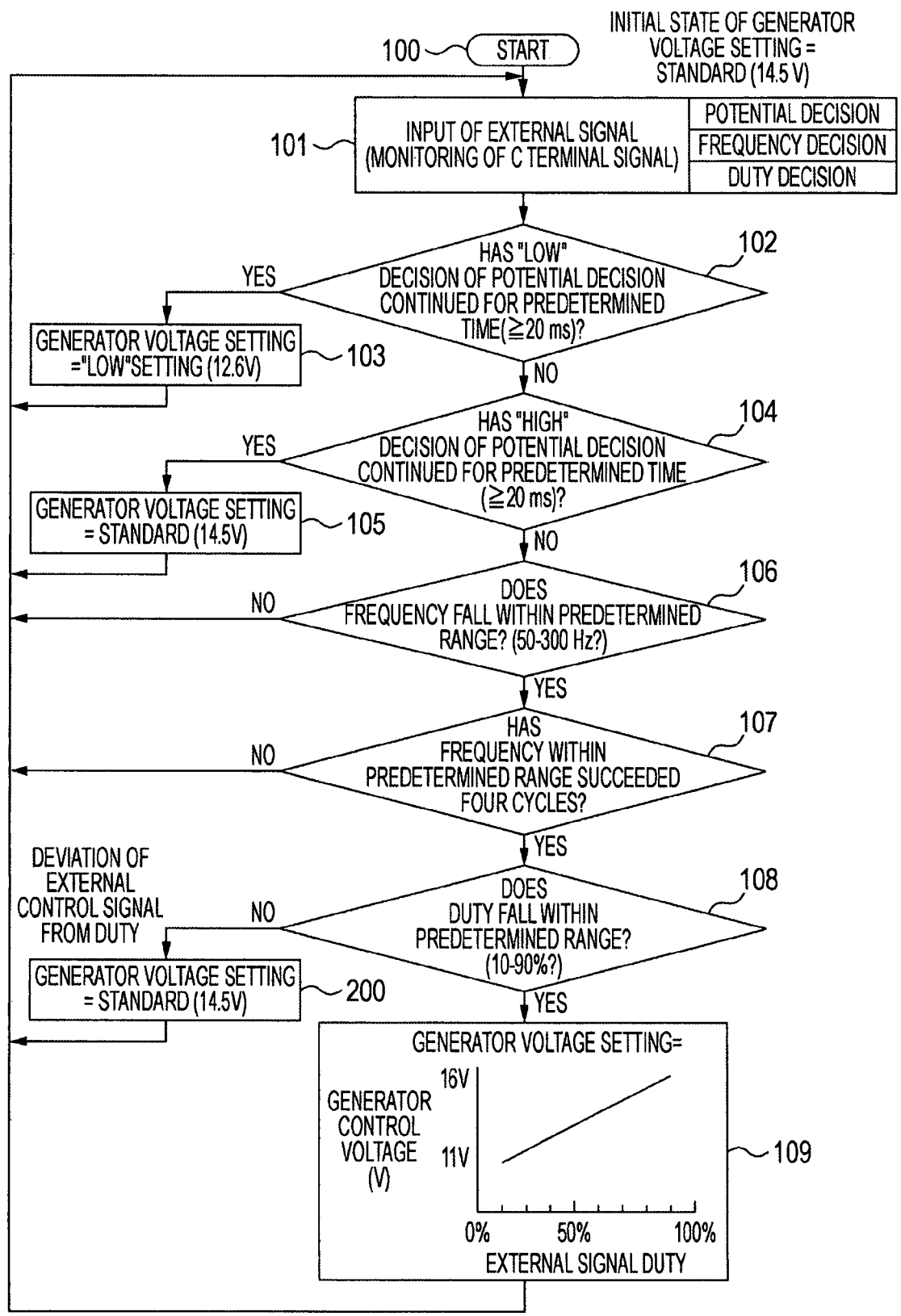
FIG. 3 is a flow chart showing a control concept in Embodiment 1 of this invention.
Figure 4:
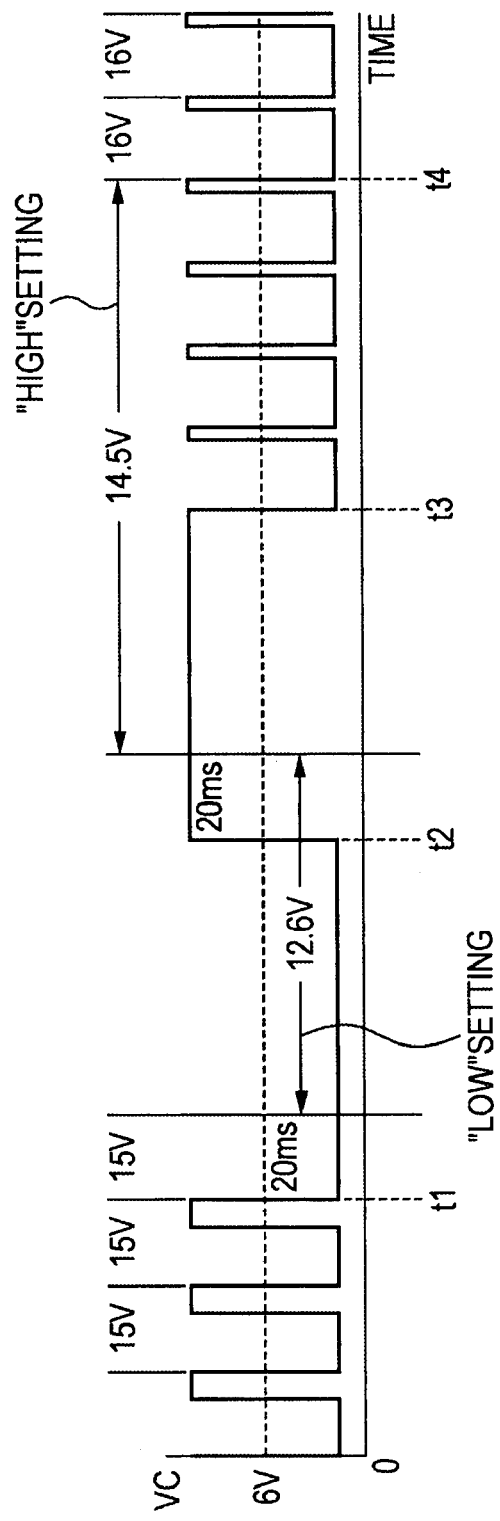
FIG. 4 is a time series diagram showing the changes-over of a c-terminal potential and a control voltage in Embodiment 1 of this invention.

Next, the operation of changing-over the two-stage control and the multistage control by the control device 3 shown in FIG. 2 will be described with reference to FIGS. 3 and 4. FIG. 3 is a flow chart showing a control concept, while FIG. 4 is a time series diagram showing the changes-over of the potential of the c terminal and the control voltage. Referring to FIG. 3, there will be described a case where the initial state of generator voltage setting is set at, for example, 14.5 V (ordinary voltage) (step 100).

Now, when an external signal of predetermined frequency is inputted to the c terminal by the turn-ON/OFF of the transistor 27 of the ECU-side circuit (step 101), the potential of the external signal is first decided with a threshold value at 6 V, by the potential decision means 20 including the voltage sensor 13 and 14. In a case where the result of the decision is "LOW", if the "LOW" decision continues for, at least, a predetermined time period (for example, at least 20 ms) is decided by the "LOW" time measurement circuit 202, and in a case where the "LOW" decision has continued (step 102), the generator voltage is made "LOW" setting (for example, 12.6 V) (step 103). On the other hand, in a case where the potential decision is a "HIGH" decision and where the "HIGH" decision has continued for, at least, a predetermined time period (for example, at least 20 ms) by the decision of the "HIGH" time measurement circuit 203 (step 104), the generator control voltage is made "HIGH" setting (for example, 14.5 V) (step 105). Thus, in the case where the decided potential by the potential decision means 20 has continued for, at least, the predetermined time period, the two-stage control of the control voltage is performed.

Subsequently, in a case where the decided potential by the potential decision means 20 does not continue for, at least, the predetermined time period, if the frequency range of the external signal falls within a predetermined range (of, for example, 50-300 Hz) is decided (step 106), and besides, if the frequency within the predetermined range (predetermined cycle) has succeeded four cycles is decided by the signal frequency measurement circuit 204 (step 107). Only in a case where this condition has been satisfied, the duty analysis of the external signal is made by the duty measurement circuit 205 (step 108), and in a case where the duty of the external signal falls within a predetermined range (of, for example, 10-90%), the control voltage is changed-over to the multistage control (step 109). By the way, in a case where the duty of the external signal deviates from the predetermined range (of, for example, 10-90%), the generator control voltage is set at the standard voltage of 14.5 V (step 200).

The signal duty measurement circuit 205 includes a memory (not shown) for retaining therein a table in which the relationship between the duty ratio of the external signal and the generator control voltage becomes a linear function. By way of example, the generator control voltage is 12 V for the duty ratio of 10-20%, it is 13 V for the duty ratio of 20-40%, it is 14 V for the duty ratio of 40-60%, and it is 15 V for the duty ratio of 60-80%, and it is 16 V for the duty ratio of 80-90%. That is, when the frequency component within the predetermined range (of 50-300 Hz) is detected in the external signal inputted to the c terminal, the generator control voltage is governed by the multistage control. However, the changeover from the two-stage control to the multistage control is effected after pulses being the frequency components within the predetermined range (of, for example, 50-300 Hz) have been detected the predetermined number of times (four successive times), whereby a filter function is bestowed so as to prevent the changeover from erroneously occurring on account of a logical shift ascribable to burst noise.

Referring to FIG. 4 which shows the changes-over of the c-terminal potential and the control voltage, during a period 0-t1, each of pulses whose external-signal duty ratios are, for example, 60-80% continues for a time period shorter than 20 ms, and hence, the generator control voltage of 15 V is outputted. The "LOW" decision continues for, at least, 20 ms since the time t1, so that the generator control voltage is subjected to the "LOW" setting at 12.6 V. The "HIGH" decision is rendered at a time t2, and it continues for, at least, 20 ms, too, so that the generator control voltage is subjected to the "HIGH" setting at 14.5 V. The "LOW" decision fails to continue for, at least, 20 ms since a time t3, and a period during which each of pulses whose external-signal duty ratios are on that occasion is, for example, 80-90% continues for a time period shorter than 20 ms, so that the generator control voltage of 16 V is outputted. On this occasion, in order to bestow the filter action, the "HIGH" setting of 14.5 V is released after the succession of the four pulses has been confirmed.

As described above, the control apparatus for the vehicular AC generator according to Embodiment 1 analyzes, at least, the "HIGH" logic continuation time period, the "LOW" logic continuation time period and the pulse width duty of the external signal, for the external signal pulse inputted from the external unit. Also, in the case where the "HIGH" logic or "LOW" logic of the external signal pulse has continued for the predetermined time period, the generator is controlled by either of the adjustment voltages which consist of the two values of the ordinary voltage and the voltage lower than the ordinary voltage, whereas in the case where the "HIGH" logic or "LOW" logic of the external signal pulses is iterated within the predetermined time period and where the pulse width duties of the external signals fall within the predetermined range, the generator is controlled by the multistage or linear adjustment voltage which is the function of the pulse-width duty ratio. It is therefore possible to provide the system configuration which can efficiently cope with both the scheme that generates either of the adjustment voltages of the two stages in accordance with the transition of the c-terminal potential, and the scheme that generates the multistage or linear adjustment voltage in accordance with the duty ratio of the external signal pulses.

Embodiment 2

Figure 5:
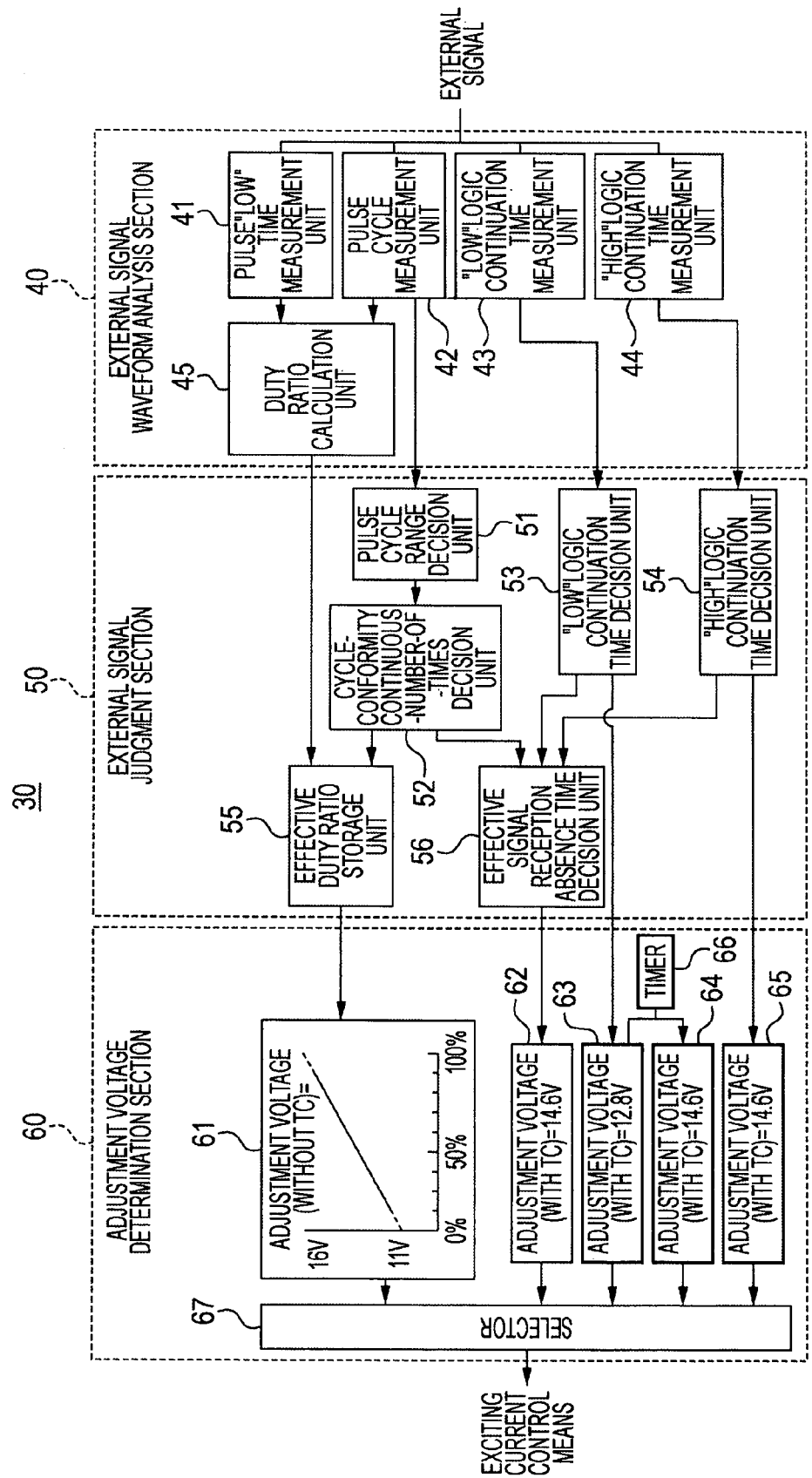
FIG. 5 is a detailed circuit configuration diagram of the logic circuit portion of a control device according to Embodiment 2 of this invention.
Figure 6:
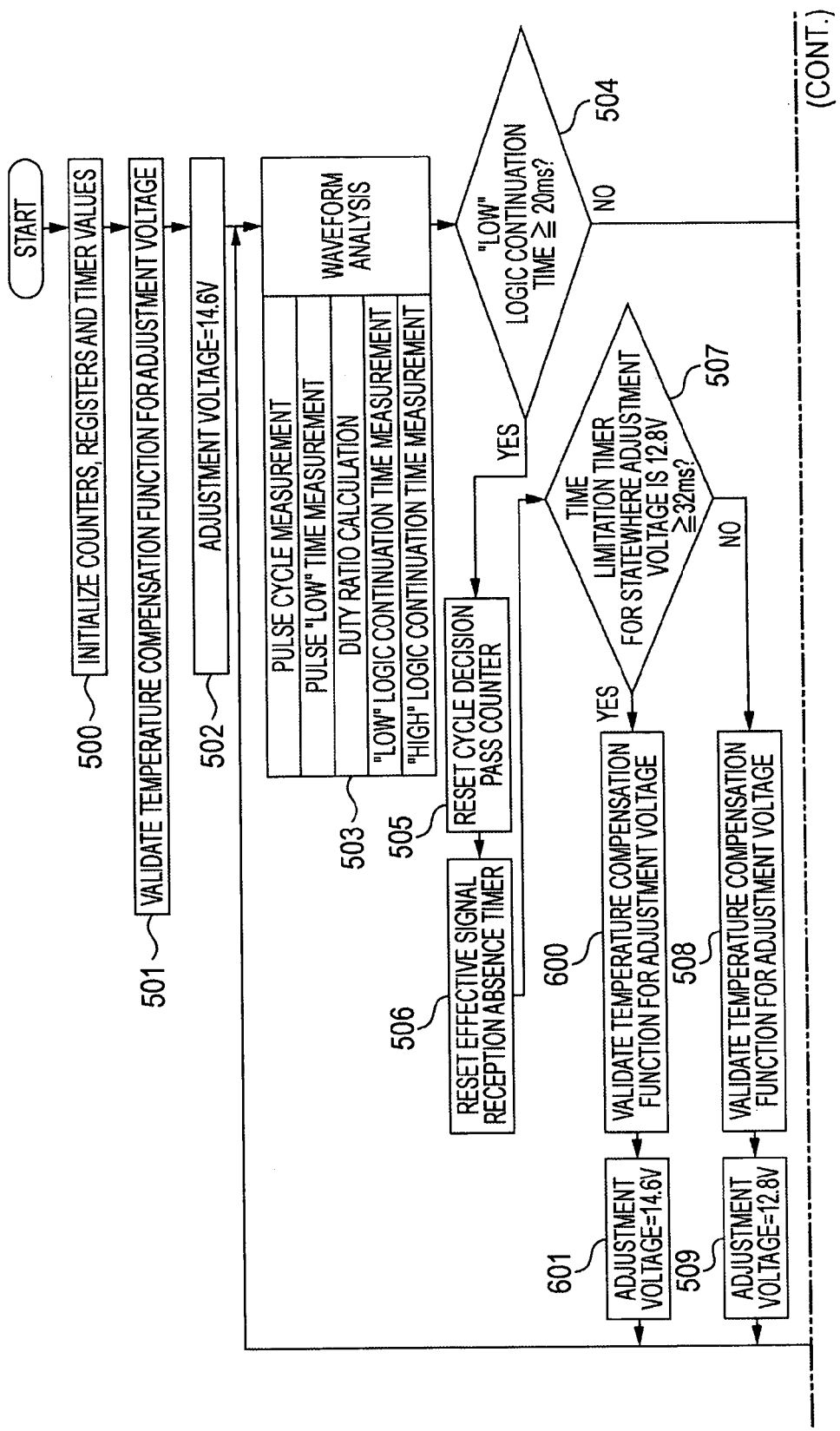
FIG. 6 is a flow chart showing a control concept in Embodiment 2 of this invention.

Embodiment 2 describes still another embodiment of the control device 3 illustrated in Embodiment 1. FIG. 5 is the detailed circuit configuration diagram of a logic circuit 30, while FIG. 6 is a flow chart showing a control concept based on the circuit shown in FIG. 5. The circuit in FIG. 5 is broadly configured of the three circuit sections of an external signal waveform analysis section 40, an external signal judgment section 50 and an adjustment voltage determination section 60. The external signal waveform analysis section 40 receives an external signal pulse from an ECU, and the adjustment voltage determination section 60 is connected to exciting current control means similar to that of Embodiment 1. Further, the external signal waveform analysis section 40 includes a pulse "LOW" time measurement unit 41, a pulse cycle measurement unit 42, a "LOW" logic continuation time measurement unit 43, a "HIGH" logic continuation time measurement unit 44 and a duty ratio calculation unit 45. Besides, the external signal judgment section 50 includes a pulse cycle range decision unit 51, a cycle-conformity continuous-number-of-times decision unit 52, a "LOW" logic continuation time decision unit 53, a "HIGH" logic continuation time decision unit 54, an effective duty ratio storage unit 55 and an effective signal reception absence continuation time decision unit 56. Further, the adjustment voltage determination section 60 includes a linear adjustment voltage setting unit 61, fixed adjustment voltage setting units 62-65, a timer 66 and a selector 67.

Hereinbelow, the operation of changing-over the two-stage control and the multistage control as is based on this circuit will be described with reference to the flow chart of FIG. 6. In the figure, an example in the case of endowing adjustment voltages with a temperature compensation function is illustrated. The temperature compensation function is the function of changing the adjustment voltages in correspondence with the temperature characteristics of a battery, and the configuration of the function itself is well known and shall not be described in detail. First, individual counters, registers and timer values are initialized (step 500), whereupon the temperature compensation function is validated (step 501). Besides, there will be described a case where the initial state of generator voltage setting is set at 14.6 V being an ordinary voltage as will be stated later (step 502).

Now, when the external signal waveform analysis section 40 receives the pulse signal for which a predetermined duty ratio is set, from the ECU (step 503), a pulse "LOW" time period and a pulse cycle are first measured by the pulse "LOW" time measurement unit 41 and the pulse cycle measurement unit 42, respectively, and the duty ratio is calculated by the duty ratio calculation unit 45 on the basis of the measured results. The calculated result is stored in the effective duty ratio storage unit 55 of the external signal judgment section 50. Subsequently, if a "LOW" decision continues for, at least, a predetermined time period (for example, at least 20 ms) is decided by the "LOW" logic continuation time measurement unit 43 and the "LOW" logic continuation time decision unit 53 (step 504). In a case where the "LOW" decision has continued, a cycle judgment pass counter (not shown) is reset (step 505), and the timer of the effective signal reception absence continuation time judgment unit 56 is reset (step 506), whereupon the temperature compensation function of the adjustment voltage is validated (step 508), and the adjustment voltage is subjected to "LOW" setting. The "LOW" setting on this occasion may be selected between 12.4 and 13.0 V under a reference temperature condition which is selected when the constituent component temperatures of the adjustment voltage control device are between 20 and 25° C. In this regard, a case where the adjustment voltage is set at 12.8 V is illustrated here (step 509), and the "LOW" setting is set at the fixed value of 12.8 V as the adjustment voltage (with the temperature compensation TC) (refer to the unit 63 in FIG. 5). When the adjustment voltage of 12.8 V is continued for a predetermined limitation time, for example, 32 sec by the timer 66 (step 507), there is the danger of battery discharge, and hence, the adjustment voltage is returned to the ordinary voltage (14.6 V) (step 601) in the same state where the temperature compensation function is validated (step 600) (refer to the unit 64 in FIG. 5).

On the other hand, if a "HIGH" decision has continued for, at least, a predetermined time period (for example, at least 20 ms) is decided by the "HIGH" logic continuation time measurement unit 44 and the "HIGH" logic continuation time decision unit 54 (step 602). In a case where the "HIGH" decision has continued, a cycle decision pass counter (not shown) is reset (step 603), the timer of the effective signal reception absence continuation time decision unit 56 is reset (step 604) and a time limitation timer (not shown) in the state where the adjustment voltage is 12.8 V is reset (step 605), whereupon the temperature compensation function is validated (step 606), and the adjustment voltage is subjected to "HIGH" setting (ordinary voltage). In general, the "HIGH" setting may be determined to the adjustment voltage which is selected between 14.4 and 14.8 V under the reference temperature condition which is selected when the constituent component temperatures of the control device are between 20 and 25° C. By way of example, a case where the adjustment voltage is set at 14.6 V will be described here (step 607) (refer to the unit 65 in FIG. 5).

Next, in a case (step 608) where the "HIGH" logic or "LOW" logic of the external signal pulses is iterated within a predetermined time period, that is, where both the steps 504 and 602 result in "NO's", and where the pulse cycle range decision unit 51 has decided that the pulse cycle of the external signal falls within a predetermined range, the continuous number of times of cycle conformity is counted by the cycle decision pass counter (not shown) included in the cycle-conformity continuous-number-of-times decision unit 52 (step 609). In a case where the number of times has continued, for example, four times (step 610), the timer of the effective signal reception absence continuation time decision unit 56 is reset (step 611), and the time limitation timer (not shown) in the state where the adjustment voltage is 12.8 V is reset (step 612), whereupon the temperature compensation function is invalidated (step 613), and the linear adjustment voltage setting unit 61 (refer to FIG. 5) is caused to function, whereby the generator control voltage is controlled as the multistage or linear adjustment voltage which is the function of the pulse width duty ratio (step 614). That is, the two-stage control is changed-over to the multistage control.

By the way, in a case where the cycle deviates from the predetermined range or where the number of times of conformity at the step 610 does not continue, for example, four times (step 610), and where the timer of the effective signal reception absence continuation time decision unit 56 holds true (step 616), the time limitation timer (not shown) in the state where the adjustment voltage is 12.8 V is reset (step 617), whereupon the temperature compensation function is validated (step 618), and the adjustment voltage is set at the ordinary voltage of 14.6 V (step 619) (refer to the unit 62 in FIG. 5). Although the changeover from the two-stage control to the multistage control has been described above, a changeover from the multistage control to the two-stage control is easily performed.

As described above, the control apparatus for the vehicular AC generator according to Embodiment 2 includes the adjustment voltage determination means for controlling the generator control voltage as either of the adjustment voltages consisting of the two values of the ordinary voltage and the voltage lower than the ordinary voltage, in the case where the "HIGH" logic or "LOW" logic of the external signal pulse has continued for the predetermined time period, and as the multistage or linear adjustment voltage which is the function of the pulse width duty ratio, in the case where the "HIGH" logic or "LOW" logic of the external signal pulses is iterated within the predetermined time period and where the pulse width duty of the external signal falls within the predetermined range. The adjustment voltage determination means determines the generator control voltage to the adjustment voltage which is selected between 14.4 and 14.8 V under the reference temperature condition that is selected when the constituent component temperatures of the control device are between 20 and 25° C., in the case where the "HIGH" logic has continued for the predetermined time period. On the other hand, the adjustment voltage determination means determines the generator control voltage to the adjustment voltage which is selected between 12.4 and 13.0 V under the same reference temperature condition, in the case where the "LOW" logic has continued for the predetermined time period, and it returns the generator control voltage to the adjustment voltage of the ordinary voltage, in the case where the adjustment voltage selected between 12.4 and 13.0 V has continued for, at least, the predetermined time period. Thus, the control apparatus of higher stability and higher precision can be obtained.

Various modifications and alterations of this invention will be apparent to those skilled in the art without departing from the scope and spirit of this invention, and it should be understood that this invention is not limited to the illustrative embodiments set forth herein.

What is claimed is:

1. A control apparatus for a vehicular AC generator, comprising exciting current control means for controlling an exciting current of the generator which is driven by an internal combustion engine, so that a power generation voltage of the generator or a voltage interlocking with the power generation voltage may become a predetermined adjustment voltage; external signal waveform analysis means for analyzing, at least, a "HIGH" logic continuation time, a "LOW" logic continuation time, and a pulse width duty of an external signal, for the external signal pulse inputted from an external unit; and adjustment voltage determination means for controlling said exciting current control means by setting either of adjustment voltages which consist of two values of an ordinary voltage and a voltage lower than the ordinary voltage, in a case where a "HIGH" logic or a "LOW" logic of the external signal pulse has continued for a predetermined time period, and by setting a multistage or linear adjustment voltage which is a function of the pulse width duty ratio, in a case where the "HIGH" logic or "LOW" logic of the external signal pulses is iterated within a predetermined time period and where the pulse width duty of the external signal falls within a predetermined range.

2. A control apparatus for a vehicular AC generator as defined in claim 1, wherein said adjustment voltage determination means controls said exciting current control means by setting the multistage or linear adjustment voltage which is the function of the pulse width duty ratio, only in a case where the "HIGH" logic or "LOW" logic of the external signal pulses is iterated within the predetermined time period, where frequencies or cycles of the external signal pulses continue a predetermined number of times within a predetermined range, and where the pulse width duties of the external signals fall within a predetermined range.

3. A control apparatus for a vehicular AC generator as defined in claim 1, wherein said adjustment voltage determination means controls said exciting current control means by setting the adjustment voltage of the ordinary voltage, in a case where the pulse width duty of the external signal deviates from a predetermined range.

4. A control apparatus for a vehicular AC generator as defined in claim 1, wherein in case of the adjustment voltage which is determined when the continuation of the "LOW" logic for the predetermined time period has been detected, said adjustment voltage determination means imposes a predetermined time limitation on continuation of a state of the adjustment voltage, so as to forcibly change-over the adjustment voltage to the adjustment voltage which is determined when continuation of the "HIGH" logic for the predetermined time period has been sensed, in a case where the limited time period has been exceeded.

5. A control apparatus for a vehicular AC generator as defined in claim 1, wherein in the case where the "HIGH" logic has continued for the predetermined time period, said adjustment voltage determination means determines the adjustment voltage which is selected between 14.4 and 14.8 V under a reference temperature condition that is selected when constituent component temperatures of a control device are between 20 and 25° C., and in the case where the "LOW" logic has continued for the predetermined time period, said adjustment voltage determination means determines the adjustment voltage which is selected between 12.4 and 13.0 V under the same reference temperature condition.

6. A control apparatus for a vehicular AC generator as defined in claim 1, wherein said adjustment voltage determination means includes adjustment voltage temperature compensation means for compensating the adjustment voltage, depending upon temperatures, and the temperature compensation function for the adjustment voltage is invalidated in the case where the adjustment voltage is determined as the function of the pulse width duty ratio, whereas the temperature compensation function for the adjustment voltage is validated in the case where the "HIGH" logic or "LOW" logic of the external signal pulse has continued for the predetermined time period.

7. A control apparatus for a vehicular AC generator as defined in claim 1, wherein an analysis of a pulse cycle is contained in the waveform analysis which is made by said external signal waveform analysis means, and said adjustment voltage determination means shifts from a state where the predetermined adjustment voltage that is not based on the function is determined, into a state where the adjustment voltage is determined as the function of the pulse width duty ratio, when the analyzed pulse cycles agree a predetermined continuous number of times within a predetermined monitoring cycle range.

* * * * *